United States Patent
Nielsen

(10) Patent No.: US 12,281,640 B2
(45) Date of Patent: Apr. 22, 2025

(54) ATTACHMENT TO A SANDWICH STRUCTURE ELEMENT

(71) Applicant: LM Wind Power A/S, Kolding (DK)

(72) Inventor: Lars Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 671 days.

(21) Appl. No.: 17/311,078

(22) PCT Filed: Dec. 5, 2019

(86) PCT No.: PCT/EP2019/083799
§ 371 (c)(1),
(2) Date: Jun. 4, 2021

(87) PCT Pub. No.: WO2020/115198
PCT Pub. Date: Jun. 11, 2020

(65) Prior Publication Data
US 2022/0042493 A1 Feb. 10, 2022

(30) Foreign Application Priority Data

Dec. 5, 2018 (EP) .................... 18210370

(51) Int. Cl.
*F03D 80/30* (2016.01)
*F03D 1/06* (2006.01)
(52) U.S. Cl.
CPC ........... *F03D 80/30* (2016.05); *F03D 1/0675* (2013.01); *F05B 2230/60* (2013.01); *F05B 2240/30* (2013.01)

(58) Field of Classification Search
CPC .... F03D 80/30; F03D 1/0675; F05B 2230/60; F05B 2240/30; F05B 2260/301; F05B 2260/502; Y02E 10/72
See application file for complete search history.

(56) References Cited

U.S. PATENT DOCUMENTS 953,780 A * 4/1910 Duguid .................... B60B 9/06
152/105
959,336 A * 5/1910 Geiger .................. B60G 11/36
267/28

(Continued)

FOREIGN PATENT DOCUMENTS

CN 103696911 A 4/2014
CN 203640932 U 6/2014

(Continued)

OTHER PUBLICATIONS

English machine translation of CN 103696911A, Oct. 26, 2023.*

(Continued)

*Primary Examiner* — Moshe Wilensky
(74) *Attorney, Agent, or Firm* — Nath, Goldberg & Meyer; Jerald L. Meyer

(57) ABSTRACT

Disclosed is a wind turbine blade and a method of for attaching one or more components to a sandwich structure element of a wind turbine blade. The Wind turbine blade comprising a bushing inserted through a hole provided through a sandwich structure element, and a first component attached to a first bushing part and an elastically compressible element being arranged between a first component surface of the first component and a first side of the sandwich structure element.

30 Claims, 10 Drawing Sheets

(56) References Cited

U.S. PATENT DOCUMENTS

| | | | | | |
|---|---|---|---|---|---|
| 1,611,970 | A | * | 12/1926 | Wheat | B66C 23/50 |
| | | | | | 212/253 |
| 1,975,094 | A | * | 10/1934 | Fiteh | B66C 13/06 |
| | | | | | 212/331 |
| 8,562,302 | B2 | * | 10/2013 | Bakhuis | F03D 1/0675 |
| | | | | | 294/82.11 |
| 9,719,487 | B2 | * | 8/2017 | Bech | F03D 1/0675 |
| 2006/0280613 | A1 | | 12/2006 | Hansen | |
| 2009/0196751 | A1 | | 8/2009 | Jacobsen et al. | |
| 2010/0276536 | A1 | | 11/2010 | Lambert et al. | |
| 2017/0297185 | A1 | * | 10/2017 | Caywood | B64C 27/06 |
| 2018/0135602 | A1 | | 5/2018 | Tobin et al. | |

FOREIGN PATENT DOCUMENTS

| | | |
|---|---|---|
| DE | 102010062819 A1 | 6/2012 |
| EP | 1664528 B2 | 11/2019 |

OTHER PUBLICATIONS

Priority Search Report issued on May 21, 2019 for application No. EP18210370.5.

International Search Report issued on May 2, 2020 for application No. PCT/EP2019/083799.

* cited by examiner

ATTACHMENT TO A SANDWICH STRUCTURE ELEMENT

This is a National Phase Application filed under 35 U.S.C. 371 as a national stage of PCT/EP2019/083799, filed Dec. 5, 2019, an application claiming the benefit of Application No. EP 18210370.5, filed Dec. 5, 2018, the content of each of which is hereby incorporated by reference in its entirety.

The present disclosure relates to a method for attaching one or more components to a sandwich structure element. In particular, the present disclosure relates to attachment of a bracket for supporting a lightning protection component, such as a lightning receptor and/or lightning cables of a wind turbine blade.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a down conductor that is able to connect a lightning current to earth.

A wind turbine blade is typically assembled by a number of components. For example, a typical wind turbine blade is manufactured by moulding individual shell halves, shear webs etc.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

Lightning receptors are usually an electrically conductive object being configured with a view for capturing and conducting a lightning current. Lightning receptors may be added to the wind turbine blade after assembling the two blade parts. For example, by drilling a hole through the shell in order to gain access to a bracket inside the blade, which is connected to a down conducting cable. Such a bracket may be a metal assembly being connected to a shear web. See for example, EP 1 664 528 B1.

Lightning protection components, such as a bracket for supporting lightning receptors, and/or other internal components, e.g. components for de-icing systems, may be attached to parts, such as internal parts of the wind turbine blade, such as a spar or shear web.

A spar, spar cap, shear web or other parts of a wind turbine blade may be so called sandwich structure elements, meaning that they comprise two layers of relatively thin, stiff and strong faces, e.g. fibre reinforced polymer, separated by a core of light weight material, e.g. foam or balsa.

SUMMARY

It is an object of the present disclosure to provide elements and methods for supporting and/or installing receptors of a lightning protection system in a more advantageous way.

Accordingly, a method for attaching one or more components to a sandwich structure element, such as a sandwich structure element of a wind turbine blade comprising a root region, an airfoil region with a tip, a pressure side, a suction side and a chord line extending between a leading edge and a trailing edge. The sandwich structure element comprises a first side and a second side opposite the first side. The sandwich structure element has a sandwich structure element thickness between the first side and the second side.

The method comprises providing a hole through the sandwich structure element. For example, the hole may be drilled through the sandwich structure element.

The method comprises providing a bushing extending from a first bushing end to a second bushing end. The bushing has a bushing length from the first bushing end to the second bushing end. The bushing length is longer than the sandwich structure element thickness.

The method comprises inserting the bushing through the hole provided through the sandwich structure element, such that the second bushing end is positioned at the second side of the sandwich structure element and the first bushing end is positioned at the first side of the sandwich structure element, and such that a first bushing part extending between the first side of the sandwich structure element and the first bushing end.

The method optionally comprises applying an elastically compressible element along the first bushing part.

The method comprises attaching a first component of the one or more components to the first bushing part. For example, such that the elastically compressible element is arranged between a first component surface of the first component and the first side of the sandwich structure element. The first component may be attached at the first bushing end, e.g. such that the first component is separated from the first side of the sandwich structure element by the first bushing part.

Also disclosed is a wind turbine blade comprising a root region, an airfoil region with a tip, a pressure side, a suction side and a chord line extending between a leading edge and a trailing edge. The wind turbine blade comprises a sandwich structure element comprising a first side and a second side opposite the first side and having a sandwich structure element thickness between the first side and the second side.

The wind turbine blade comprises a bushing being inserted through a hole provided through the sandwich structure element. The bushing extends from a first bushing end to a second bushing end. The bushing has a bushing length from the first bushing end to the second bushing end. The bushing length is longer than the sandwich structure element thickness.

The second bushing end is positioned at the second side of the sandwich structure element. The first bushing end is positioned at the first side of the sandwich structure element, such that a first bushing part extends between the first side of the sandwich structure element and the first bushing end.

The wind turbine blade comprises a first component attached to the first bushing part, e.g. at the first bushing end. The first component may be separated from the first side of the sandwich structure element by the first bushing part. The wind turbine blade may comprise an elastically compressible element being arranged between a first component surface of the first component and the first side of the sandwich structure element.

The wind turbine blade may undergo elastic deformation during operation, and the shape and/or position of components, such as the first component, of the wind turbine blade may be affected by these deformations and result in transfer of loads via attachment, e.g. to the sandwich structure, potentially leading to damages of the sandwich structure. It is an advantage of the present disclosure that such transfer of loads is reduced. Hence, the sandwich structure element may be less susceptible to damage.

It is a further advantage of at least some parts of the disclosure, that a firm coupling may be provided between components on each side of a sandwich structure element, while avoiding or limiting the dependency of compressive resistance of the sandwich structure element. Previously, components being attached to a sandwich structure element by tightening a fastener extending through the sandwich structure element depended on compressive resistance of the sandwich structure element, and due to creep of the sandwich structure element the attachment may become loose over time.

The first component may be a lightning receptor bracket of a wind turbine blade. However, the concept of the present disclosure may be applied for other components that are to be attached to a sandwich structure element, such as a shear web.

A first load distributor, e.g. a washer, may be applied at the first side of the sandwich structure. The method may comprise applying a first load distributor, e.g. a washer, at the first side of the sandwich structure element. The first load distributor may be applied to the first side of the sandwich structure element, such that the elastically compressible element is arranged between the first component surface of the first component and the first load distributor. The first load distributor may abut the first side of the sandwich structure element. The first load distributor may be applied onto the bushing, such as onto the first bushing part.

The elastically compressible element may be a spring, such as a helical spring. Alternatively or additionally, the elastically compressible element may be a rubber material. For example, the elastically compressible element may be a rubber spring. The elastically compressible element may exhibit a spring constant of less than 500 N/mm. The elastically compressible element may exhibit a spring constant between 5-500 N/mm, such as 5-50 N/mm, such as 10-20 N/mm.

The sandwich structure element may comprise a first laminate layer at the first side and/or a second laminate layer at the second side. The first side and the second side, such as the first laminate layer and the second laminate layer, may be separated by a core of light weight material, e.g. balsa or foam, such as PVC foam.

The sandwich structure element may be a shear web or a side of a spar of a wind turbine blade. For example, the sandwich structure element may be a leading-edge shear web or a trailing edge shear web. Alternatively, the sandwich structure element may be a part of the shell of the wind turbine blade. The first side of the sandwich structure element may be a trailing edge side or a leading-edge side of the sandwich structure element. The second side of the sandwich structure element may be a leading-edge side or a trailing edge side of the sandwich structure element.

The hole through the sandwich structure element may have a hole diameter, e.g. the hole through the sandwich structure element may be provided with the hole diameter. The bushing has an outer bushing diameter. The bushing diameter may be between 1-5% smaller than the hole diameter. By having a bushing diameter smaller than the hole diameter, the bushing may be inserted into the hole with reduced friction and/or move within the hole with reduced friction. Allowing movement of the bushing relative to the sandwich structure element further reduce transfer of loads to the sandwich structure element, further reducing the risk of damaging the sandwich structure. Allowing movement of the bushing relative to the sandwich structure element may be of particular advantage, in embodiments where the first component is firmly attached to the bushing.

The bushing may be inserted through the hole provided through the sandwich structure element, such that the bushing extends from the first side of the sandwich structure element to the second side of the sandwich structure element.

The first component may be maintained on the bushing by a first end retainer. The first end retainer may be fastened, such as bolted and/or soldered, to the first bushing end and/or to the first bushing part. For example, Attaching the first component to the first bushing part may comprise fastening, e.g. bolting and/or soldering, a first end retainer to maintain the first component attached to the first bushing part. The first component may be arranged between the first bushing end and the first end retainer. For example, such that the first component is clasped between the first bushing end and the first end retainer.

A second load distributor may be applied to the first bushing part, e.g. between the first component and the first end retainer. For example, attaching the first component to the first bushing part optionally comprises applying a second load distributor, e.g. between the first component and the first end retainer.

The first component may be attached to the first bushing part such as to allow movement of the first component relative to the bushing, e.g. in a longitudinal direction of the bushing. Alternatively, the first component may be attached at the first bushing end such as to restrict movement of the first component relative to the bushing in the longitudinal direction of the bushing. Thereby, a firm connection may be obtained between the first component and the bushing. A firm connection may be particularly advantageous if the first component is a component of a lightning protection system and a firm connection providing for a firm electrical connection is desired.

The first component may be provided with a first component hole. The first component hole may be configured to accommodate at least part of the first end retainer. For example, in case of the first end retainer being a bolt, the first component hole may have a diameter bigger than the shank or thread of the bolt while being smaller than the head of the bolt.

The first component hole may be configured to receive the first bushing part. Attaching the first component to the first bushing part may comprise inserting the first bushing part into the first component hole. The first component hole may be slightly oversized with respect to the bushing. For example, the first component hole may be 20 mm, while the outer bushing diameter may be 19.5 mm. By having a slightly oversized hole, the first component may move with reduced friction, and an amount of rotational movement of the first component relative to the bushing, such as about an axis perpendicular to the bushing, may be allowed. Alternatively, the first component may be provided with a recess configured to engage with the bushing, e.g. the first component may be configured to be clamped around the bushing.

Alternatively, the first component hole may have a diameter smaller than a diameter of the first bushing part, such as the outer bushing diameter. For example, in embodiments, where the first component is attached at the first bushing end and/or wherein movement of the first component relative to the bushing in the longitudinal direction of the bushing is restricted, the first component hole may have a diameter smaller than the diameter of the first bushing part.

The first bushing part may have a first bushing part length. The first bushing part length of the first bushing part may be more than 5 mm, such as between 10-30 mm, e.g. the bushing length may be between 10-35 mm longer than the sandwich structure element thickness.

The elastically compressible element may have an initial free length, e.g. between 5-300 mm, such as 10-100 mm, such as 20-40 mm, or such as 10-50 mm. The initial free length of the elastically compressible element may be longer than the first bushing part length. By having an initial free length of the elastically compressible element that is longer than the first bushing part length, the elastically compressible element exhibits a force against the first component for all positions of the first component on the bushing.

A second component may be attached to the second bushing end. For example, the method may comprise attaching a second component to the second bushing end. The second component may be a down conductor, such as a down conductor of a lightning protection system of a wind turbine blade. A second end retainer may be fastened, e.g. bolted and/or soldered, at the second bushing end to maintain the second component on the bushing. For example, attaching the second component to the second bushing end may comprise fastening, e.g. bolting and/or soldering, a second end retainer at the second bushing end, e.g. to maintain the second component on the bushing.

The second component, such as the down conductor, may be in connection with the bushing through a joint element. For example, the joint element connected to the down conductor may be attached to the second bushing end. For example, the second component may be the joint element connected to the down conductor.

The first end retainer and/or the second end retainer may be fastened to a through-going bolt, e.g. extending through the bushing. For example, the first end retainer may be a through-going bolt extending through the bushing and the second end retainer may be attached to the first end retainer. Alternatively, the second end retainer may be a through-going bolt extending through the bushing and the first end retainer may be attached to the second end retainer.

Attaching the second component to the second bushing end optionally comprises applying a third load distributor, e.g. between the second component and the second end retainer.

While the present disclosure mainly describes the invention in terms of attaching a lightning receptor bracket to a shear web of a wind turbine blade, it is emphasized that the concept may be used to attach any suitable component to any sandwich structure element.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
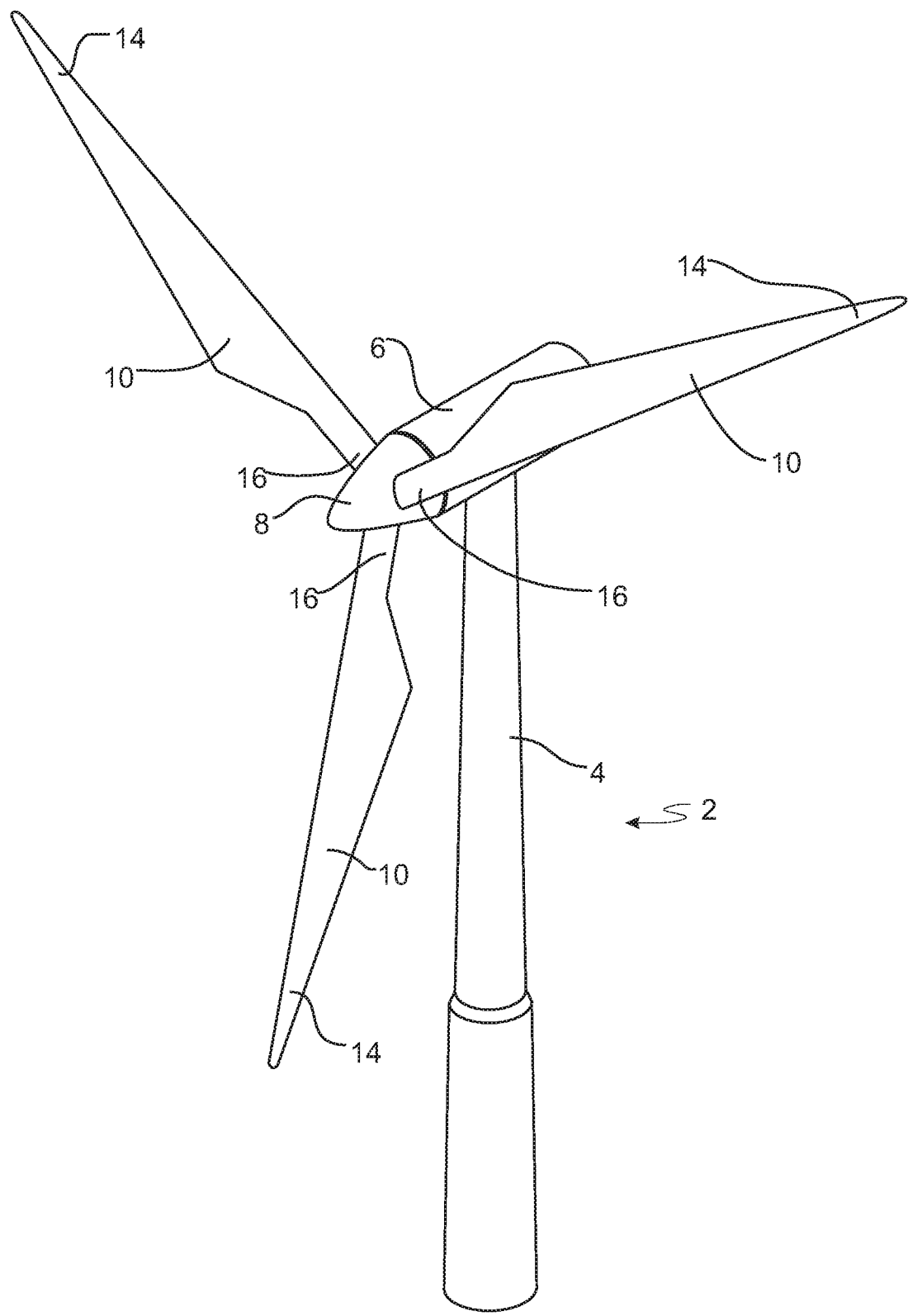
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
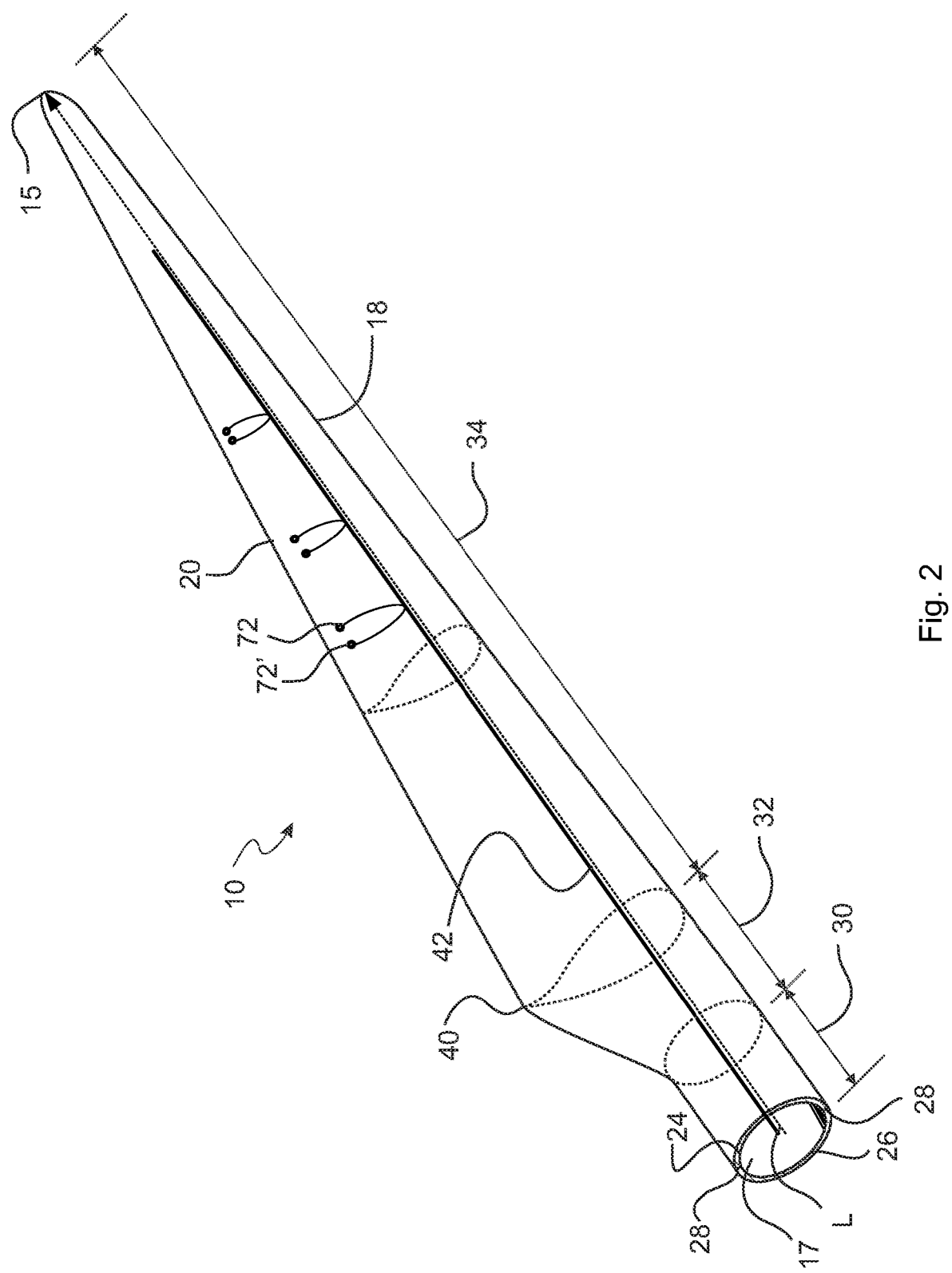
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell which may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L. One or more receptors, such as a first receptor 72 and/or a second receptor 72', are distributed along the surface of the blade, such as on the suction side 26 and/or the pressure side 24. Each of the receptors 72,72' are connected to a down conductor 42. The down conductor 42 runs in a direction along the longitudinal axis L.

Figure 3:
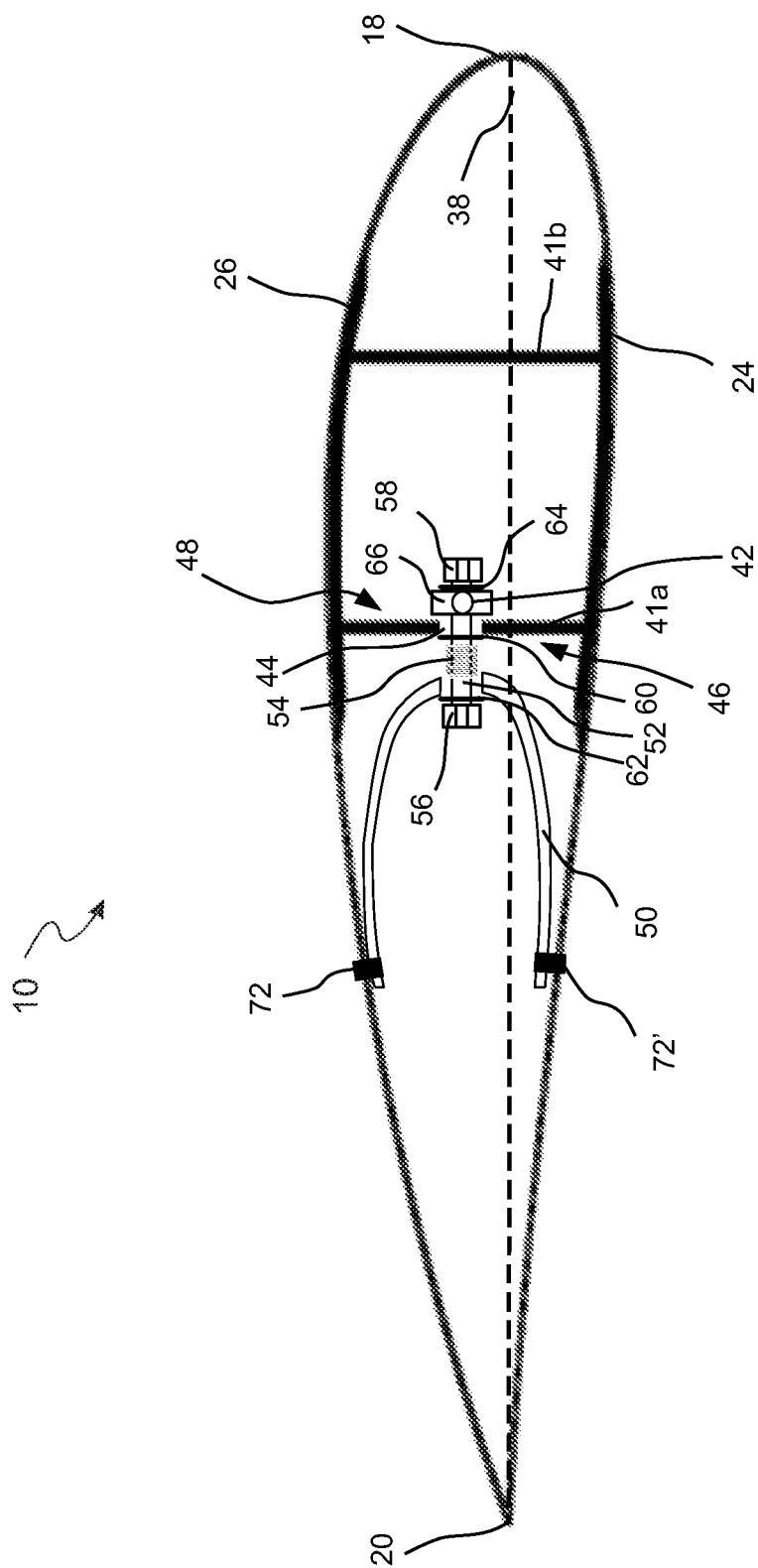
FIG. 3 is a schematic diagram illustrating a cross section of an exemplary wind turbine blade.

FIG. 3 is a schematic diagram illustrating a cross section of the airfoil region of an exemplary wind turbine blade 10, such as the wind turbine blade 10 of FIG. 2. The wind turbine blade 10 comprises a trailing edge 20, a leading edge 18, a pressure side 24, a suction side 26, shear webs, such as a trailing edge shear web 41a and a leading-edge shear web 41b, and a chord line 38 extending from the leading edge 18 to the trailing edge 20. The shear webs 41a, 41b could, in an alternative wind turbine blade, be sides of a spar. Thus, although in the following, examples are provided with reference to a wind turbine blade comprising shear webs, these could be replaced by sides of a spar. The wind turbine blade 10 also comprises a number of sandwich structure elements 41. For example, as indicated, the shear webs 41a, 41b are sandwich structure elements. A sandwich structure element 41, such as the shear webs 41a, 41b, consists of outer faces that are relatively stiff and strong, e.g. glass-fibre layers, separated by a, relatively lightweight, core material, e.g. balsa wood or foam. The wind turbine shells, such as the pressure side and/or the suction side may also be provided as a sandwich structure element.

The wind turbine blade 10 further comprises a lightning receptor bracket 50 at the first side 46 of the trailing edge shear web 41a. Although not specifically illustrated, it will be understood that the wind turbine blade 10 could alternatively or additionally comprise a lightning receptor bracket between the leading edge 18 and the leading edge shear web 41b. The lightning receptor bracket 50 may be electrically conductive and may support and/or be electrically connected to lightning receptors 72,72' located in the shell parts of the wind turbine blade 10, as described in relation to FIG. 2. The lightning receptor bracket 50 is fastened to a bushing 52. The bushing is provided in a hole 44 in the trailing edge shear web 41a. A compressible element 54, such as an elastic spring element, is located between the lightning receptor bracket 54 and the shear web 41a. A first load distributor 60, such as a first washer, is located between the shear web 41a and the compressible element 54. A second load distributor 62 is located between the lightning receptor bracket 50, and a first 56 retainer, such as a bolt or a nut.

At the second side 48 of the shear web 41b the bushing is fastened by a second retainer 58, such as a bolt or a nut. A down conductor 42 is in connection with the bushing 44 through a joint element 66. A third load distributor 64, such as a third washer, is located between the joint element 66 and the second retainer 58.

FIGS. 4-8 are schematic diagrams illustrating a cross section of a sandwich structure element 41, such as the trailing edge shear web 41a or the leading-edge shear web 41b as illustrated in FIG. 3. The sandwich structure element 41 comprises a first laminate layer 45 at the first side 46 and a second laminate layer 47 at the second side 48. The first laminate layer 45 and the second laminate layer 47 is separated by a core 49, e.g. of light weight material, e.g. balsa or foam, such as PVC foam. The sandwich structure element 41 has a first side 46 and a second side 48 and a sandwich thickness D1 between the first side 46 and the second side 48.

In FIGS. 4-8 a method for attaching one or more components, e.g. a lightning receptor bracket to a sandwich structure element, such as a shear web, is illustrated.

Figure 4:
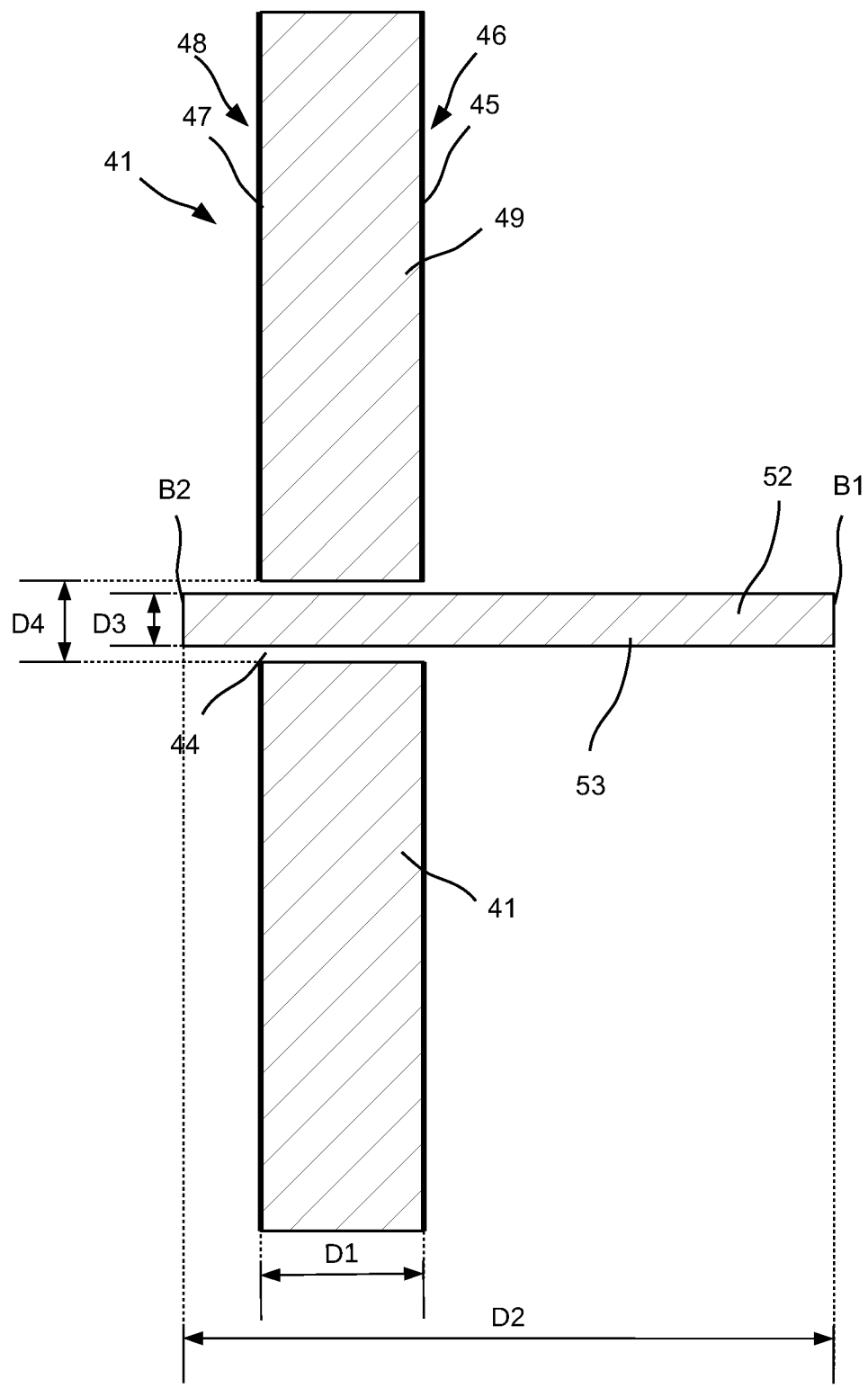
FIG. 4 is a schematic diagram illustrating a cross section of a sandwich structure.

With reference to FIG. 4, to attach one or more components to the sandwich structure element 41, a hole 44 is provided through the sandwich structure element 41. A bushing 52 extending from a first bushing end B1 to a second bushing end B2 is provided and inserted through the hole 44, such that the second bushing end B2 is positioned at the second side 48 of the sandwich structure element 41, and the first bushing end B1 is positioned at the first side 46 of the sandwich structure element 41. The bushing length D2 is longer than the sandwich structure element thickness D1.

A first bushing part 53 extends between the first side 46 of the sandwich structure element 41 and the first bushing end B1. The hole 44 through the sandwich structure element 41 has a hole diameter D4. The bushing has an outer bushing diameter D3.

Figure 5:
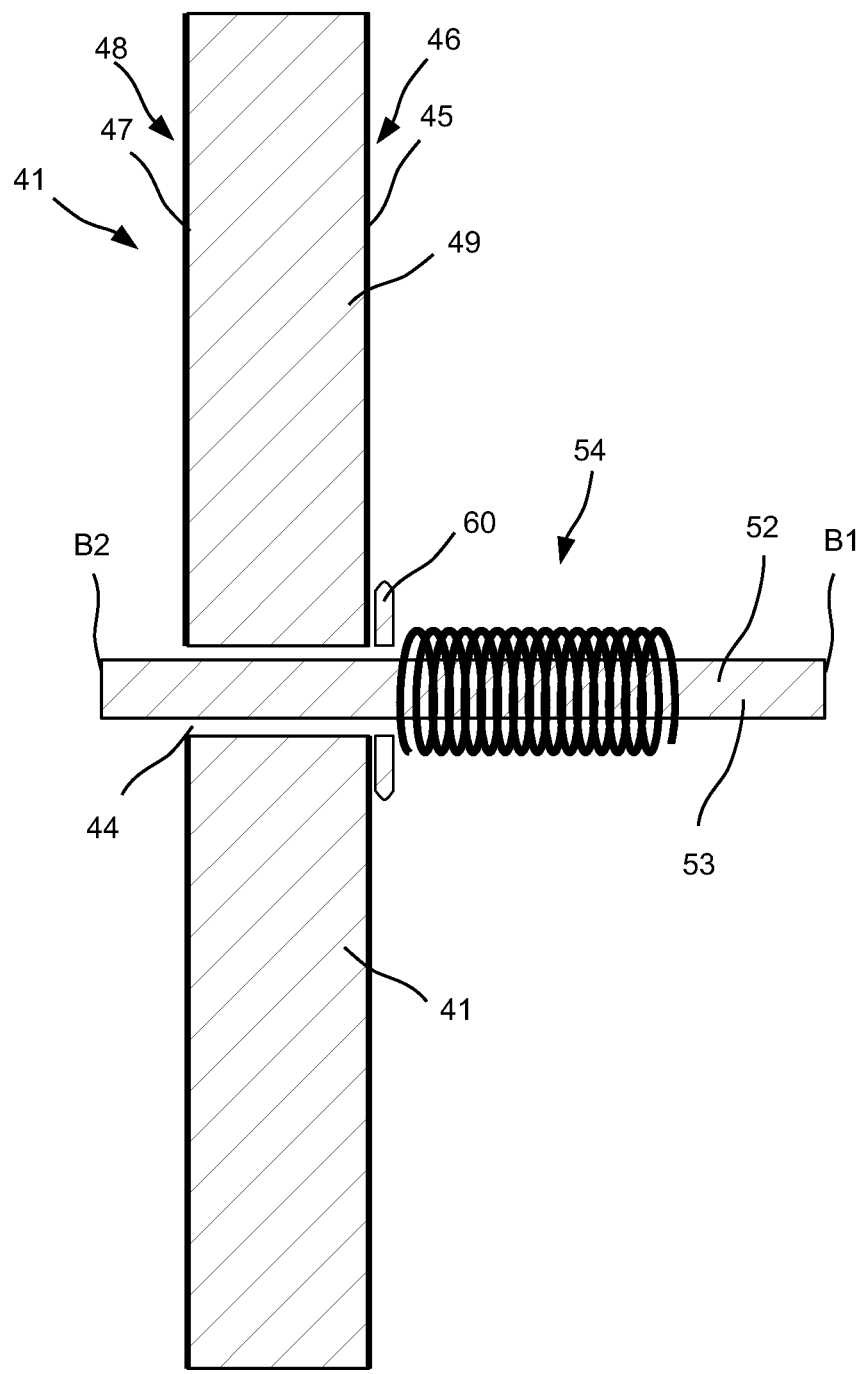
FIG. 5 is a schematic diagram illustrating a cross section of a sandwich structure.

In FIG. 5 an elastically compressible element 54, such as spring, e.g. a helical spring, is applied along the first bushing part 53. An optional first load distributor 60, such as a first washer, is also illustrated to be applied at the first side 46 of the sandwich structure element 41. The first load distributor 60 is applied at the first side 46 of the sandwich structure element 41. The first load distributor 60 may abut the first side 46 of the sandwich structure element 41.

Figure 6:
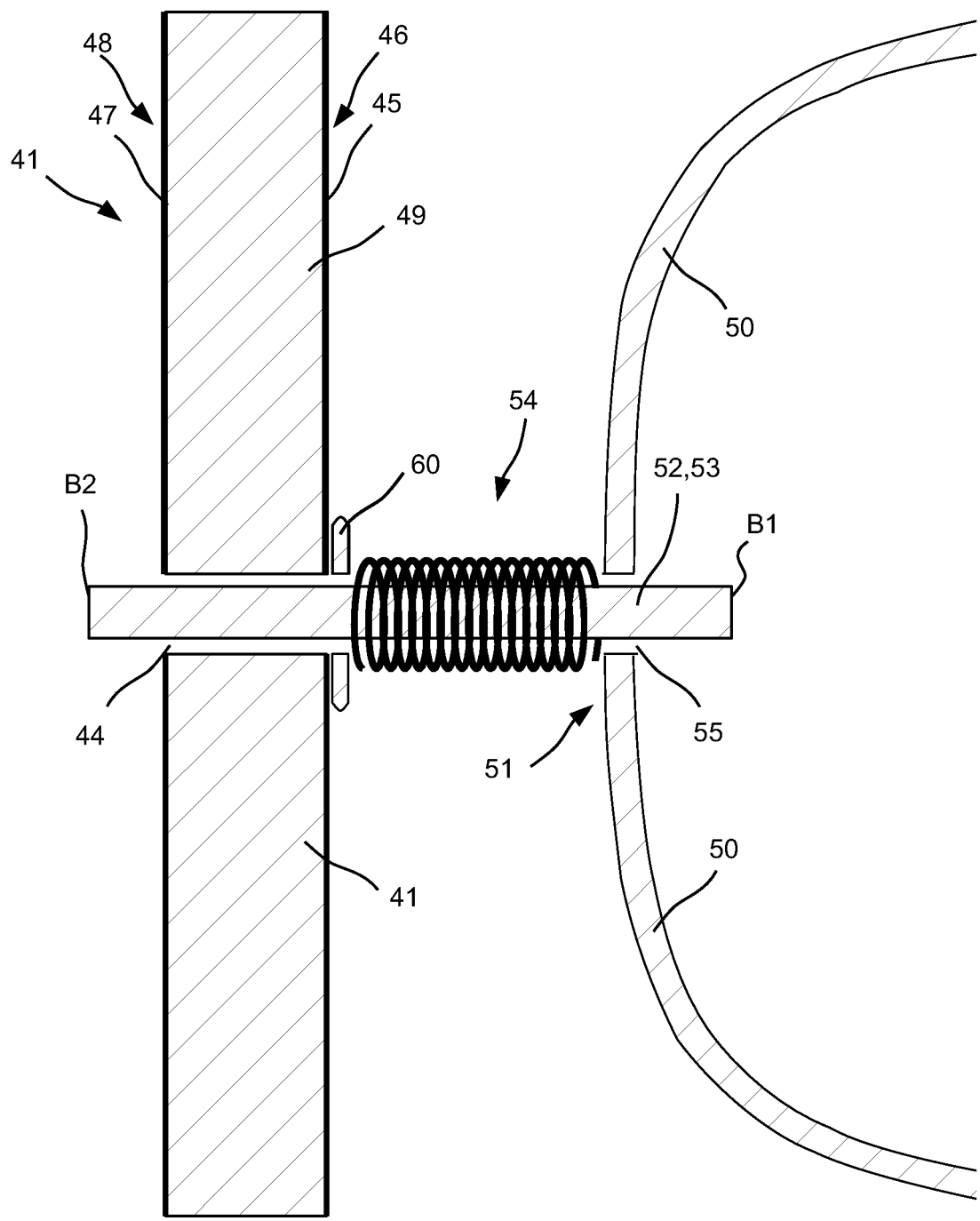
FIG. 6 is a schematic diagram illustrating a cross section of a sandwich structure.

Referring now to FIG. 6 the first component 50 is attached to the first bushing part 53 such that the elastically compressible element 54 is arranged between a first component surface 51 of the first component 50 and the first side 46 of the sandwich structure element 41. The elastically compressible element 54 is arranged between the first component surface 51 of the first component 50 and the first load distributor 60, e.g. the elastically compressible element 54 may extend between the first load distributor 60 and the first component surface 51 of the first component 50. In the present example, the first component 50 is illustrated to be a lightning receptor bracket. The first component 50 is provided with a first component hole 55 to receive the first bushing part 53. The first component hole 55 may be slightly oversized with respect to the outer bushing diameter D3 (see FIG. 4), e.g. the first component hole 55 may be 20 mm, while the outer bushing diameter D3 may be 19.5 mm.

The first component 50 is attached to the first bushing part 53, such as to allow movement of the first component 50 relative to the bushing 52 in a longitudinal direction of the bushing 52, while the elastically compressible element 54 primarily positions the first component 50 in a preferred position. The allowance of longitudinal movement of the first component against the elastically compressible element 54 reduces transfer of forces from the first component 50 to the sandwich structure 41, thus reducing transfer of loads to the sandwich structure element 41.

Figure 7:
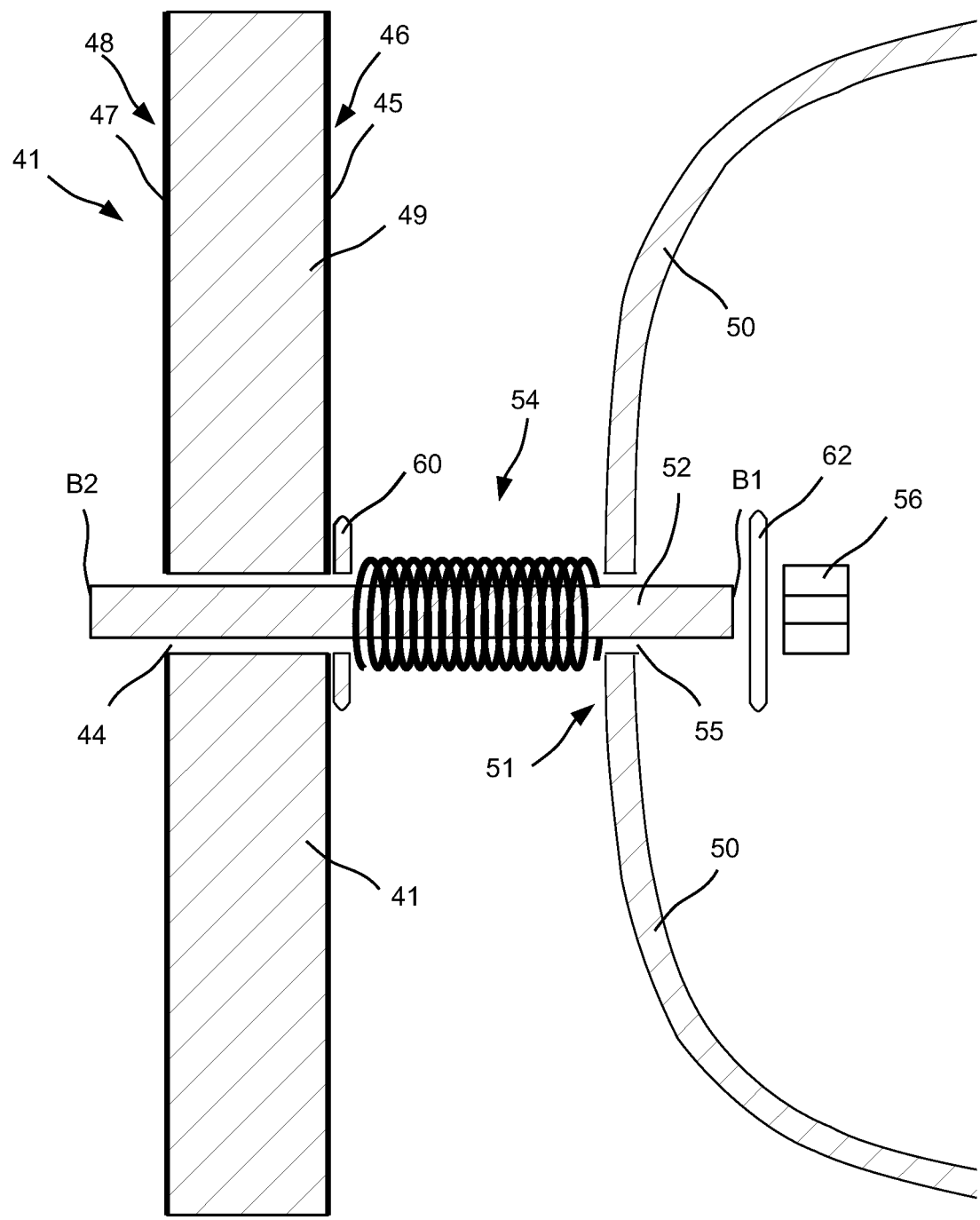
FIG. 7 is a schematic diagram illustrating a cross section of a sandwich structure.

Referring now to FIG. 7 a first end retainer 56, such as a bolt or a nut, is fastened at the first bushing end B1. The first end retainer 56 is provided to maintain the first component 50 on the bushing 52. A second load distributor 62, such as a second washer, may be placed between the first end retainer 56 and the first component 50, as illustrated.

Figure 8:
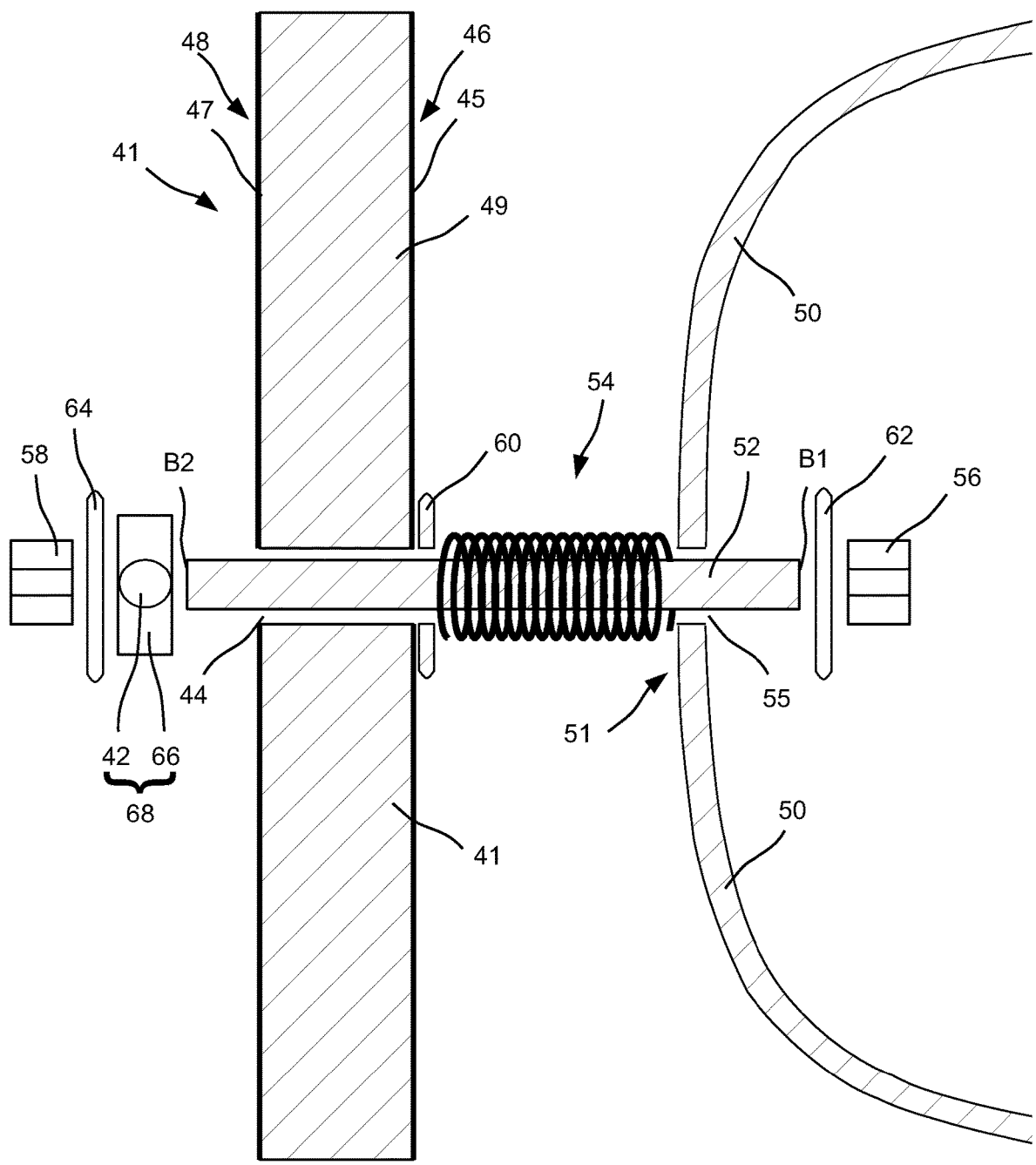
FIG. 8 is a schematic diagram illustrating a cross section of a sandwich structure.

Referring now to FIG. 8 a second component 68 is attached to the second bushing end B2. The second component 68 may comprise a down conductor 42 of a lightning protection system. The down conductor 42 may extend in the lengthwise direction of the wind turbine blade, e.g. at the second side 48 of the shear web. The down conductor 42 may comprise several sections joined at joint elements, such as joint element 66 joining a first section of the down conductor and a second section of the down conductor. The second component 68 may be attached to the bushing 52 by means of a second end retainer 58, such as a bolt or a nut. A third load distributor 64, such as a third washer, may be applied between the second end retainer 58 and the second component 68, as illustrated.

The first end retainer 56 and/or the second end retainer 58 may be fastened to a through-going bolt (not showed) extending through the bushing 52. For example, the first end retainer 56 may be a through-going bolt extending through the bushing 52 and the second end retainer 58 may be attached to the first end retainer 56, or vice versa.

In the illustrated example, wherein the first component is a lightning receptor bracket, the current from a lightning strike may travel from the first component 50, through the busing 52, and to the down conductor 42, which may be connected to ground.

While, as illustrated in FIGS. 6-8, the first component 50 may be attached to the bushing 52, e.g. to the first bushing part 53, such as to allow movement of the first component 50 relative to the bushing 52, the first component 50 may alternatively be attached at the first busing end B1, such as to restrict movement of the first component relative to the bushing, and such that the first component 50 is separated from the first side 46 of the sandwich structure element 41 by the first bushing part 53. For example, the first component 50 may be arranged between the first bushing end B1 and the first end retainer 56 and the optional second load distributor 62. For example, such that the first component 50 is clasped between the first bushing end B1 and the first end retainer 56 and/or second load distributor 62.

Figure 9:
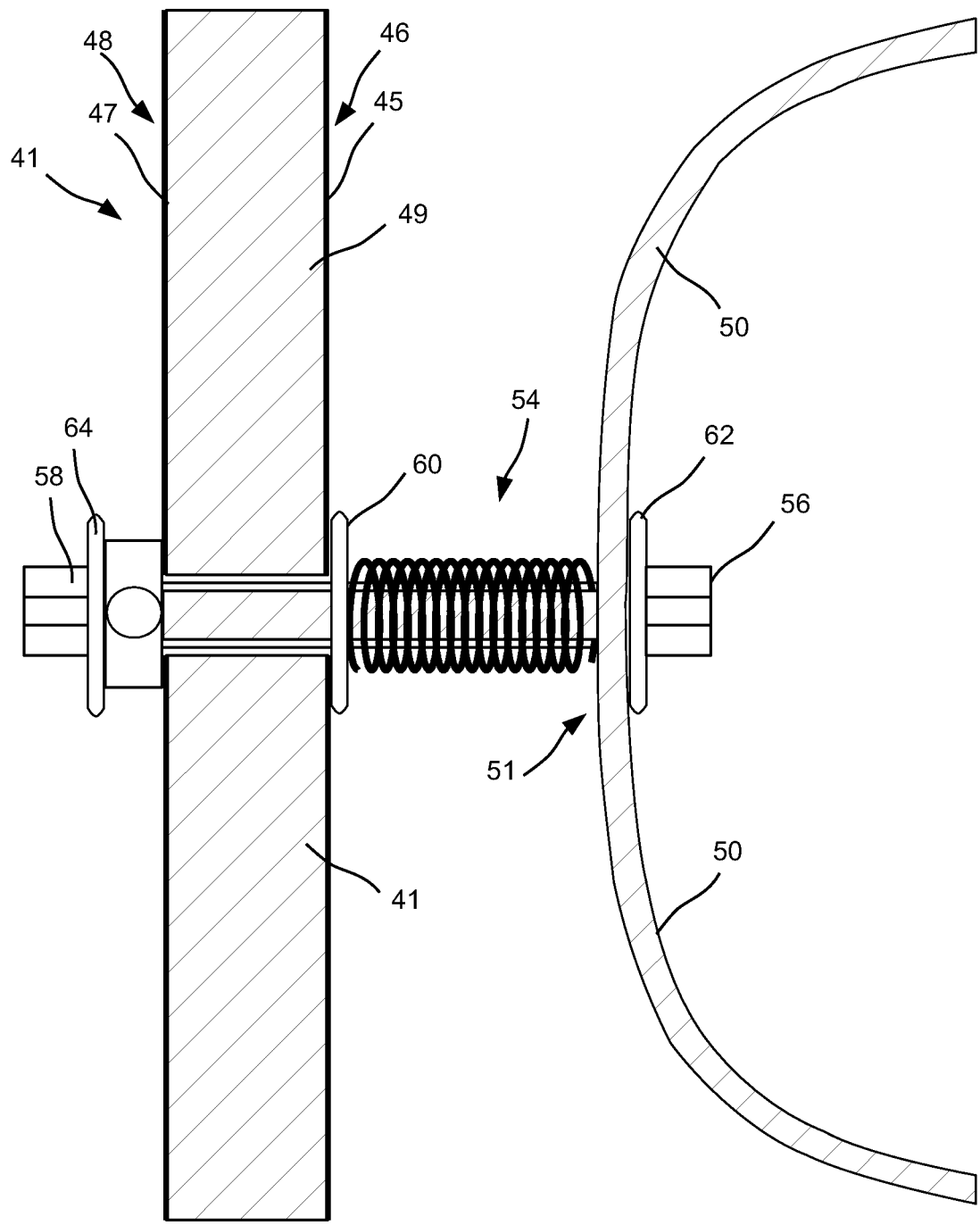
FIG. 9 is a schematic diagram illustrating a cross section of a sandwich structure.

FIG. 9 is a schematic diagram illustrating the assembled result as described with respect to FIGS. 4-8.

Figure 10:
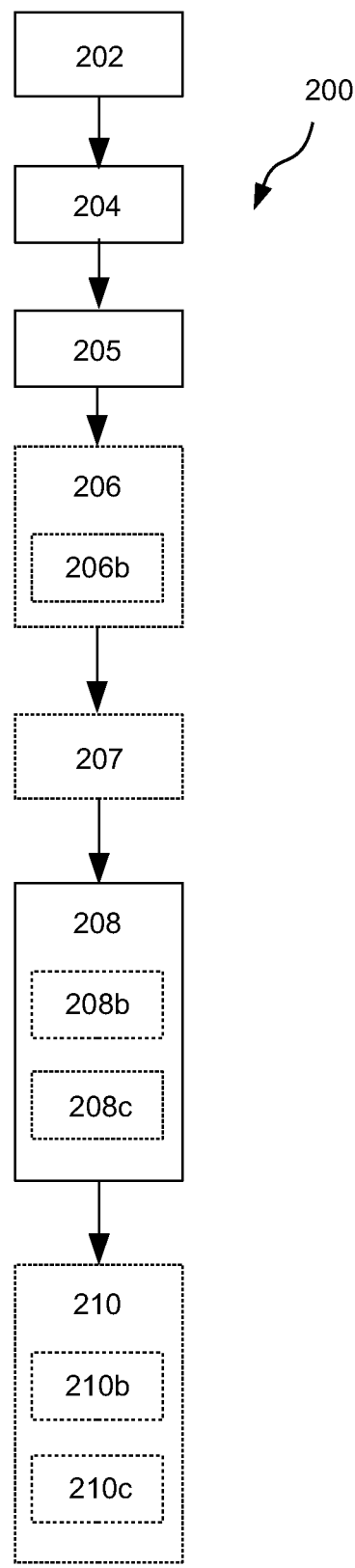
FIG. 10 is a block diagram of an exemplary method for attaching one or more components to a sandwich structure.

FIG. 10 is a block diagram of an exemplary method for attaching one or more components to a sandwich structure. The method 200 comprises providing 202 a hole through the sandwich structure element.

The method 200 comprises providing 204 a bushing extending from a first bushing end to a second bushing end. The bushing has a bushing length from the first bushing end to the second bushing end. The bushing length is longer than the sandwich structure element thickness.

The method 200 comprises inserting 205 the bushing through the hole, such that the second bushing end is positioned at the second side of the sandwich structure element, and the first bushing end is positioned at the first side of the sandwich structure element with a first bushing part extending between the first side of the sandwich structure element and the first bushing end.

The method 200 optionally comprises applying 206 an elastically compressible element along the first bushing part.

The method 200 comprises attaching 208 a first component to the first bushing part. For example, such that the elastically compressible element is arranged between a first component surface of the first component and the first side of the sandwich structure element. The first component may be attached at the first bushing end, e.g. such that the first component is separated from the first side of the sandwich structure element by the first bushing part. For example, the first component may be attached at the first bushing end such as to restrict movement of the first component relative to the bushing in the longitudinal direction of the bushing. Alternatively, attaching 208 the first component to the first bushing part may be provided such as to allow movement of the first component relative to the bushing in a longitudinal direction of the bushing. The method 200 optionally comprises providing 207 a first component hole in the first component to receive the first bushing part. The first component hole may be slightly oversized with respect to the outer bushing diameter, e.g. the first component hole may be 20 mm, while the outer bushing diameter may be 19.5 mm. Thus, attaching 208 the first component to the first bushing part may comprise inserting the first bushing part into the first component hole.

Applying 206 the elastically compressible element optionally comprises applying 206*b* a first load distributor at the first side of the sandwich structure element, such that the elastically compressible element is arranged between the first component surface of the first component and the first load distributor. The load distributor may abut the first side of the sandwich structure element. The load distributor may be a washer.

Attaching 208 the first component to the first bushing part optionally comprises fastening 208*c* a first end retainer, e.g. a bolt to maintain the first component on the bushing. The first end retainer may be fastened 208*c* to the first bushing end and/or to the first bushing part. Furthermore, e.g. prior to fastening 208*c* the first end retainer, attaching 208 the first component to the first bushing part optionally comprises applying 208*b* a second load distributor, e.g. between the first component and the first end retainer.

The method 200 optionally comprises attaching 210 a second component to the second bushing end. For example, the second component may be a down conductor of a lightning protection system. Attaching 210 the second component to the second bushing end may comprise fastening 210*c* a second end retainer, e.g. a bolt, at the second bushing end to maintain the second component on the bushing. Furthermore, e.g. prior to fastening 210*c* the second end retainer at the second bushing end, attaching 210 the second component to the second bushing optionally comprises applying 210*b* a third load distributor, e.g. between the second component and the second retainer.

It should be noted that the order of the steps of the method may be interchanged and/or some of the steps may be performed simultaneously. For example, while attachment 210 of the second component to the second bushing end is illustrated as being performed after attachment 208 of the first component to the first bushing part, it will be understood that attachment 210 of the second component to the second bushing end may alternatively be performed, e.g., prior to applying 206 an elastically compressible element along the first bushing part and/or prior to attaching 208 the first component to the first bushing part.

Exemplary embodiments of the present disclosure are set out in the following items:

1. Method for attaching one or more components to a sandwich structure element of a wind turbine blade comprising a root region, an airfoil region with a tip, a pressure side, a suction side and a chord line extending between a leading edge and a trailing edge, the sandwich structure element comprising a first side and a second side opposite the first side and having a sandwich structure element thickness between the first side and the second side, the method comprising:
   providing a hole through the sandwich structure element;

providing a bushing extending from a first bushing end to a second bushing end, the bushing having a bushing length from the first bushing end to the second bushing end, the bushing length being longer than the sandwich structure element thickness;

inserting the bushing through the hole provided through the sandwich structure element, such that the second bushing end is positioned at the second side of the sandwich structure element and the first bushing end is positioned at the first side of the sandwich structure element, and such that a first bushing part extending between the first side of the sandwich structure element and the first bushing end;

applying an elastically compressible element along the first bushing part; and attaching a first component of the one or more components to the first bushing part, such that the elastically compressible element is arranged between a first component surface of the first component and the first side of the sandwich structure element.

2. Method according to item 1, wherein attaching the first component to the first bushing end comprises fastening a first end retainer at the first bushing end to maintain the first component on the bushing.

3. Method according to any of the preceding items further comprising applying a first load distributor at the first side of the sandwich structure element, such that the elastically compressible element is arranged between the first component surface of the first component and the first load distributor.

4. Method according to any of the preceding items, wherein attaching the first component to the first bushing part includes attaching the first component to the first bushing part, such as to allow movement of the first component relative to the bushing in a longitudinal direction of the bushing.

5. Method according to any of the preceding items, wherein the first component is provided with a first component hole to receive the first bushing part.

6. Method according to any of the preceding items, wherein the elastically compressible element is a spring, such as a helical spring.

7. Method according to any of the preceding items, wherein the elastically compressible element is a rubber material.

8. Method according to any of the preceding items, wherein the elastically compressible element exhibits a spring constant between 10-20 N/mm, and wherein the elastically compressible element has an initial free length between 30-40 mm.

9. Method according to any of the preceding items, wherein the hole through the sandwich structure element has a hole diameter, and the bushing has an outer bushing diameter, the bushing diameter being between 1-5% smaller than the hole diameter.

10. Method according to any of the preceding items, wherein a first bushing part length of the first bushing part is between 10-30 mm.

11. Method according to any of the preceding items, wherein the first component is a lightning receptor bracket.

12. Method according to any of the preceding items comprising attaching a second component to the second bushing end, wherein the second component may be a down conductor of a lightning protection system.

13. Method according to any of the preceding items, wherein the sandwich structure element comprises a first laminate layer at the first side and a second laminate layer at the second side, the first laminate layer and the second laminate layer being separated by a core of light weight material, e.g. balsa or foam, such as PVC foam.

14. Method according to any of the preceding items, wherein the sandwich structure element is a shear web or a side of a spar.

15. Wind turbine blade comprising a root region, an airfoil region with a tip, a pressure side, a suction side and a chord line extending between a leading edge and a trailing edge, the wind turbine blade comprising a sandwich structure element comprising a first side and a second side opposite the first side and having a sandwich structure element thickness between the first side and the second side, a bushing being inserted through a hole provided through the sandwich structure element, the bushing extending from a first bushing end to a second bushing end, the bushing having a bushing length from the first bushing end to the second bushing end, the bushing length being longer than the sandwich structure element thickness, the second bushing end being positioned at the second side of the sandwich structure element, and the first bushing end being positioned at the first side of the sandwich structure element, such that a first bushing part extending between the first side of the sandwich structure element and the first bushing end, the wind turbine blade comprising a first component attached to the first bushing part and an elastically compressible element being arranged between a first component surface of the first component and the first side of the sandwich structure element.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
36 tip
38 chord line
40 shoulder
41 sandwich structure element
41a trailing edge shear web
41b leading edge shear web
42 down conductor
44 bushing hole
45 first laminate layer 46 first side of sandwich structure element
47 second laminate layer
48 second side of sandwich structure element
49 sandwich core
50 first component
51 first component surface
52 bushing
53 first bushing part
54 compressible element
55 first component hole
56 first end retainer
58 second end retainer
60 first load distributor
62 second load distributor
64 third load distributor
66 joint element
68 second component
72 receptor
72' receptor
200 method
202 providing a hole through the sandwich structure element
204 providing a bushing
204b inserting bushing
206 applying elastically compressible element
206b applying first load distributor
207 providing a hole in first component
208 attaching first component
208b fastening first end retainer
208c applying second load distributor
210 attaching second component
210b applying third load distributor
210c fastening second end retainer
D1 sandwich structure element thickness
D2 bushing length
D3 outer bushing diameter
D4 sandwich structure element hole diameter
B1 first bushing end
B2 second bushing end

The invention claimed is:

1. A method for attaching one or more components to a sandwich structure element, the sandwich structure element comprising a first side and a second side opposite the first side and having a sandwich structure element thickness between the first side and the second side, the method comprising:
providing a hole through the sandwich structure element;
providing a bushing extending from a first bushing end to a second bushing end, the bushing having a bushing length from the first bushing end to the second bushing end, the bushing length being longer than the sandwich structure element thickness;
inserting the bushing through the hole provided through the sandwich structure element, such that the second bushing end is positioned at the second side of the sandwich structure element and the first bushing end is positioned at the first side of the sandwich structure element, and such that a first bushing part extends between the first side of the sandwich structure element and the first bushing end;
applying an elastically compressible element along the first bushing part; and
attaching a first component of the one or more components to the first bushing part, such that the elastically compressible element is arranged between a first component surface of the first component and the first side of the sandwich structure element, wherein the first component comprises a lightning receptor bracket.

2. The method according to claim 1, wherein attaching the first component to the first bushing includes attaching the first component at the first bushing end such that the first component is separated from the first side of the sandwich structure element by the first bushing part.

3. The method according to claim 1, wherein attaching the first component to the first bushing part comprises fastening a first end retainer to maintain the first component attached to the first bushing part.

4. The method according to claim 3, wherein the first component is arranged between the first bushing end and the first end retainer.

5. The method according to claim 3, wherein the first end retainer is fastened to the first bushing end.

6. The method according to claim 3, further comprising applying a first load distributor at the first side of the sandwich structure element, such that the elastically compressible element is arranged between the first component surface of the first component and the first load distributor.

7. The method according to claim 3, wherein attaching the first component to the first bushing part includes attaching the first component to the first bushing part, such as to allow movement of the first component relative to the bushing in a longitudinal direction of the bushing.

8. The method according to claim 3, wherein the first component is provided with a first component hole.

9. The method according to claim 8, wherein the first component hole is configured to receive the first bushing part.

10. The method according to claim 8, wherein the first component hole has a diameter smaller than a diameter of the first bushing part.

11. The method according to claim 8, wherein the first component hole is configured to accommodate at least part of the first end retainer.

12. The method according to claim 8, wherein the elastically compressible element is a spring.

13. The method according to claim 8, wherein the elastically compressible element is a rubber material.

14. The method according to claim 8, wherein the elastically compressible element exhibits a spring constant between 10-20 N/mm, and wherein the elastically compressible element has an initial free length between 30-40 mm.

15. The method according to claim 8, wherein the hole through the sandwich structure element has a hole diameter, and the bushing has an outer bushing diameter, the bushing diameter being between 1-5% smaller than the hole diameter.

16. The method according to claim 8, wherein a first bushing part length of the first bushing part is more than 5 mm.

17. The method according to claim 8, further comprising attaching a second component to the second bushing end, wherein the second component comprises a down conductor of a lightning protection system of a wind turbine blade, wherein the lightning receptor bracket, the bushing and the down conductor define an electrical path for grounding a lightning strike.

18. The method according to claim 8, wherein the sandwich structure element comprises a first laminate layer at the first side and a second laminate layer at the second side, the first laminate layer and the second laminate layer being separated by a core of light weight material.

19. A method for attaching one or more components to a sandwich structure element, the sandwich structure element comprising a first side and a second side opposite the first side and having a sandwich structure element thickness between the first side and the second side, the method comprising:
provideing a hole through the sandwich structure element;
providing a bushing extending from a first bushing end to a second bushing end, the bushing having a bushing opening having a bushing diameter, the bushing having a bushing length from the first bushing end to the second bushing end, the bushing length being longer than the sandwich structure element thickness;
inserting the bushing through the hole provided through the sandwich structure element, such that the second bushing end is positioned at the second side of the sandwich structure element and the first bushing end is positioned at the first side of the sandwich structure element, and such that a first bushing part extends between the first side of the sandwich structure element and the first bushing end; and
attaching a first component of the one or more components at the first bushing end such that the first component is separated from the first side of the sandwich structure element by the first bushing part, wherein the first component comprises a lightning receptor bracket,
wherein an elastically compressible element is applied along the first bushing part, such that the elastically compressible element is arranged between a first component surface of the first component and the first side of the sandwich structure element.

20. The method according to claim 19, further comprising applying a first load distributor at the first side of the sandwich structure element, such that the elastically compressible element is arranged between the first component surface of the first component and the first load distributor.

21. The method according to claim 19, wherein the elastically compressible element is a spring.

22. The method according to claim 19, wherein the elastically compressible element exhibits a spring constant between 10-20 N/mm, and wherein the elastically compressible element has an initial free length between 30-40 mm.

23. The method according to claim 19, wherein attaching the first component at the first bushing end includes attaching the first component such as to restrict movement of the first component relative to the bushing in a longitudinal direction of the bushing.

24. The method according to claim 19, wherein attaching the first component at the first bushing end comprises fastening a first end retainer to maintain the first component on the bushing by arranging the first component between the first bushing end and the first end retainer.

25. The method according to claim 24, wherein the first end retainer is fastened to the first bushing end.

26. The method according to claim 24, wherein the first component is provided with a first component hole to accommodate at least part of the first end retainer.

27. The method according to claim 19, wherein the hole through the sandwich structure element has a hole diameter, and the bushing has an outer bushing diameter, the bushing diameter being between 1-5% smaller than the hole diameter.

28. The method according to claim 19, wherein a first bushing part length of the first bushing part is more than 5 mm.

29. The method according to claim 19, further comprising attaching a second component to the second bushing end, wherein the second component comprises a down conductor of a lightning protection system of a wind turbine blade, wherein the lightning receptor bracket, the bushing and the down conductor define an electrical path for grounding a lightning strike.

30. The method according to claim 19, wherein the sandwich structure element comprises a first laminate layer at the first side and a second laminate layer at the second side, the first laminate layer and the second laminate layer being separated by a core of light weight material.

* * * * *